United States Patent [19]

Dixon et al.

[11] Patent Number: 4,934,859

[45] Date of Patent: Jun. 19, 1990

[54] LOCKING NUT WITH MULTIPLE THREAD FORMING LEADS

[75] Inventors: Stephen J. Dixon; Michael D. Marvell, both of Rockford, Ill.

[73] Assignees: Textron Inc., Providence, R.I.; Ryder International Corporation, Arab, Ala.; a part interest

[21] Appl. No.: 266,525

[22] Filed: Nov. 3, 1988

[51] Int. Cl.⁵ ............................................. F16B 37/16
[52] U.S. Cl. .................................... 403/274; 403/299; 411/437
[58] Field of Search ................ 411/437, 427; 403/282, 403/274, 299, 359, 13, 14, 21, 22, 406.1, 315, 279, 281, 350

[56] References Cited

U.S. PATENT DOCUMENTS

| | | | |
|---|---|---|---|
| 3,350,975 | 11/1967 | Bien | 411/437 |
| 3,491,646 | 1/1970 | Tinnerman | 411/437 X |
| 3,570,361 | 3/1971 | Tinnerman | 411/437 |
| 3,841,371 | 10/1974 | Thurston | 411/437 X |
| 4,003,668 | 1/1977 | Kelly, III et al. | 403/299 X |
| 4,599,021 | 7/1986 | Kloster | 411/437 X |

FOREIGN PATENT DOCUMENTS

2533503 11/1976 Fed. Rep. of Germany ...... 411/437
1434852 5/1976 United Kingdom .

Primary Examiner—Randolph A. Reese
Assistant Examiner—Peter M. Cuomo
Attorney, Agent, or Firm—R. A. Giangiorgi

[57] ABSTRACT

An improved fastening nut is disclosed which is secured to an unthreaded stud which is inserted through a central bore in the nut. The bore includes a guide and retaining splines which provides alignment guidance during sliding insertion of the stud into the bore. The guide splines preferably has an annular configuration with an inner diameter slightly larger than the diameter of the stud so that the initial insertion of the stud does not produce significant frictional resistance. The bore of the nut further includes a plurality of helical threads, preferably twin leads having equal pitch, which are disposed in the bore axially distinct from the guide and retaining splines and terminate within the bore adjacent the guide and retaining splines. The internal helical threads have a crest diameter smaller than the stud diameter and also projects radially inwardly into the bore further than the guide and retaining splines. The helical threads cold-form mating thread impression into the periphery of the stud and the resulting thread impression obstructs any vibrational retraction of the guide and retaining splines to promote retention of the nut on the stud.

23 Claims, 2 Drawing Sheets

LOCKING NUT WITH MULTIPLE THREAD FORMING LEADS

BACKGROUND OF THE INVENTION

This invention relates to fasteners for mounting a work piece on a support member, and further relates to improved fastening nuts which provide locking action for securement upon an unthreaded stud.

In the assembly or erection of structures in which an unthreaded stud is employed to mount a work piece upon a support member, a threaded nut has been conventionally used to cut its own mating thread into the stud as it is driven onto the stud to secure the assembled joint. For example, automotive bumpers have been provided with a protective, resilient "facia strip" which typically includes an elongate stud passing through a hole in the bumper so that a typical metallic hex nut is driven onto the projecting end of the stud to secure the protective strip on the bumper. Typically, the stud is integrally molded with the protective strip from resilient engineering resin, for example, resins commercially available under the Registered Trademark Bexloy from E. I. DuPont. The conventional metal hex nut has a tendency to bind as it is driven onto a plastic stud resulting in distortion and twisting detachment of the stud so that there is a high frequency of joint failures.

These deficiencies are eliminated by the improved fastening nut and improved joint provided by the present invention.

SUMMARY OF THE INVENTION

The improved nut is secured to an unthreaded stud which is inserted through a central bore in the nut. The bore includes a guide means which provides alignment guidance during sliding insertion of the stud into the bore. The guide means preferably has an annular configuration with an inner diameter slightly larger than the diameter of the stud so that the initial insertion of the stud does not produce significant frictional resistance. The bore of the nut further includes a plurality of partial helical threads, preferably separated by 180 degrees, but of the twin lead type having the same pitch, that is to say, the partial thread turns are opposingly located in the bore axially distinct from the guide means and terminate within the bore adjacent the guide means. The internal helical threads have respective crest diameters smaller than the stud diameter and project radially inwardly into the bore further than the guide means.

The stud is initially inserted into the bore and slides past the guide formation until it engages the lead ends of the threads. At this point, torque is applied on the nut and the partial thread turns cold-form mating thread impression into the periphery of the stud due to the 180 degrees separation of the twin lead, partial threads. The forces on the nut and stud are balanced during the cold-forming of the stud, which permits the nut to maintain a coaxial alignment and be engaged on the stud without canting or tipping. The resulting thread impression on the stud includes radially outwardly displaced, cold-formed stud material which cooperates with structure on the nut to obstruct any vibrational retraction of the nut from the stud. The nut is preferably molded from a harder material than the stud which yields to the cold-forming thread of the nut.

In a preferred illustrated embodiment of an improved joint employing the nut, the joint structure secures a resilient, protective fascia strip to an automotive bumper. The stud is integrally molded with the facia strip and is inserted through an aperture in the bumper to expose the projecting end of the stud. The stud end is inserted through the guide means within the bore of the nut. The guide means is defined by an annular pattern of inwardly inclined splines or elongate teeth with a tooth-to-tooth inner diameter slightly larger than the initial peripheral outer diameter of the stud enabling the teeth to provide aligning guidance in sliding the stud into the bore. The nut is molded from a harder plastic than the stud so that the twin helical threads cold-form mating thread impression into the stud to displace stud material, which displaced material obstructs retraction of the nut to maintain securement of the joint. The dual thread turns and the splined guide means increase beneficially the applied torque required to strip the driven nut from the stud during the cold-forming operation. The crest diameter of the nut threads is dimensioned such that the major diameter of the formed stud thread impression is greater, but not excessively larger than the tooth-to-tooth inner diameter of the annular spline or tooth pattern so that the nut can be backed off the stud by application of sufficient torque to drive the teeth through the thread impression without stripping or severely deforming the thread impression.

DESCRIPTION OF THE PREFERRED EMBODIMENT

Figure 1:
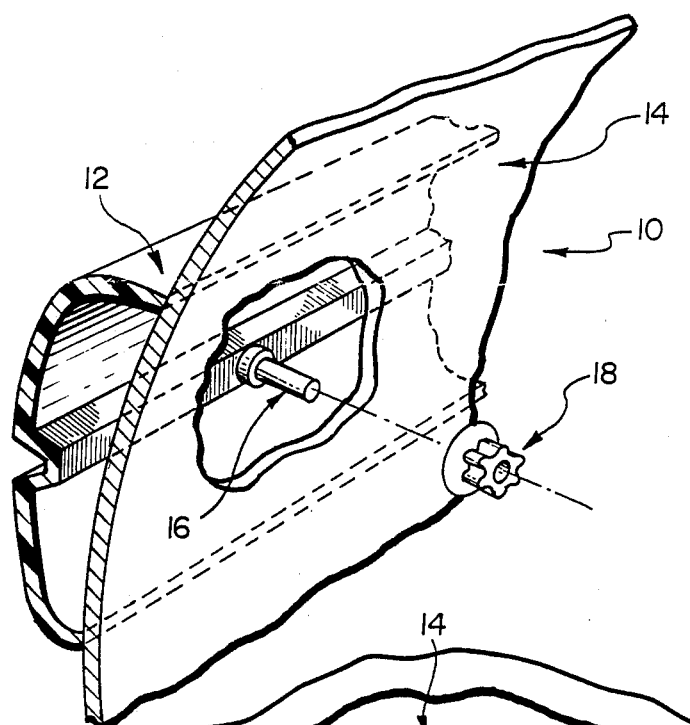
FIG. 1 is an exploded, perspective view of an embodiment of a bumper-facia strip joint and fastening nut of the invention with a portion of the bumper broken away.
Figure 2:
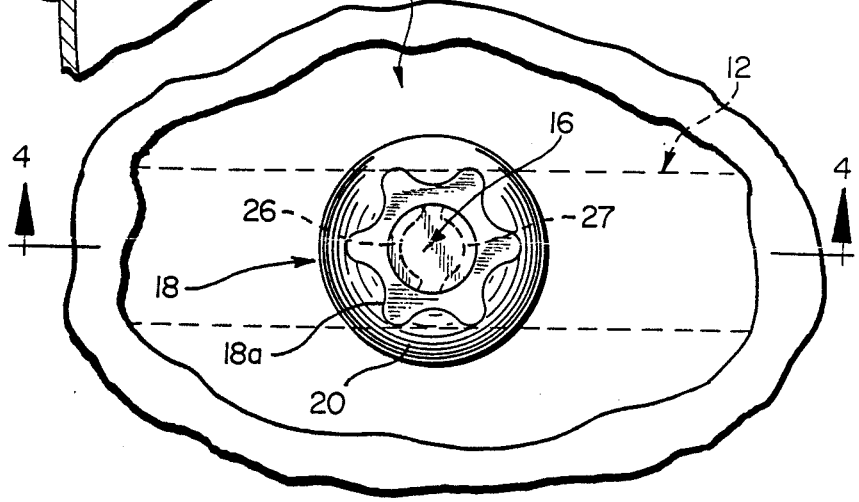
FIG. 2 is an end view of the assembled joint of FIG. 1.
Figure 3:
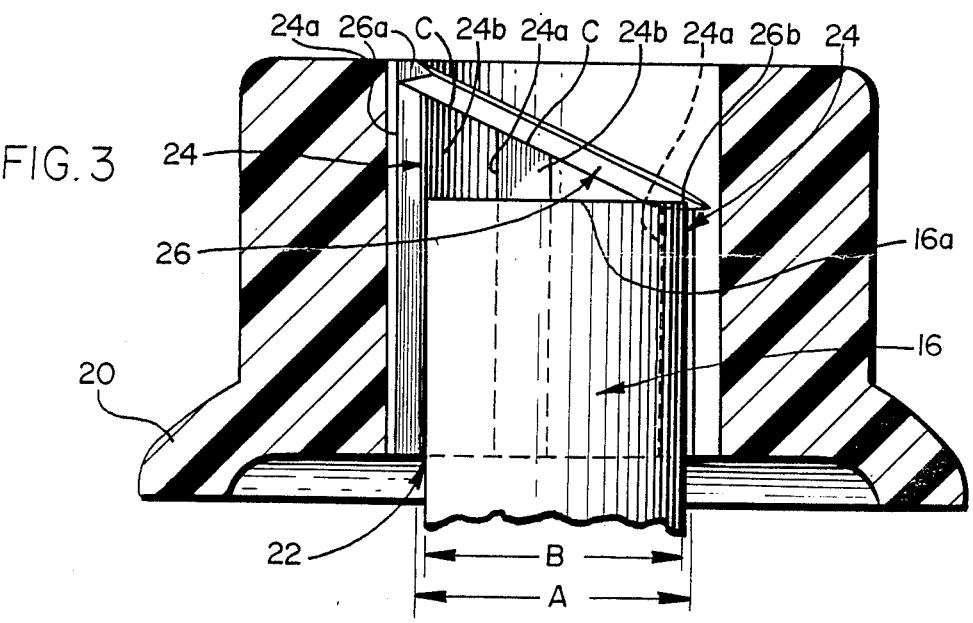
FIG. 3 is a partial sectional view in which the unthreaded stud shown in FIG. 1 is partially inserted into the bore of the nut to a point where the end of the stud abuts the nut threads.
Figure 4:
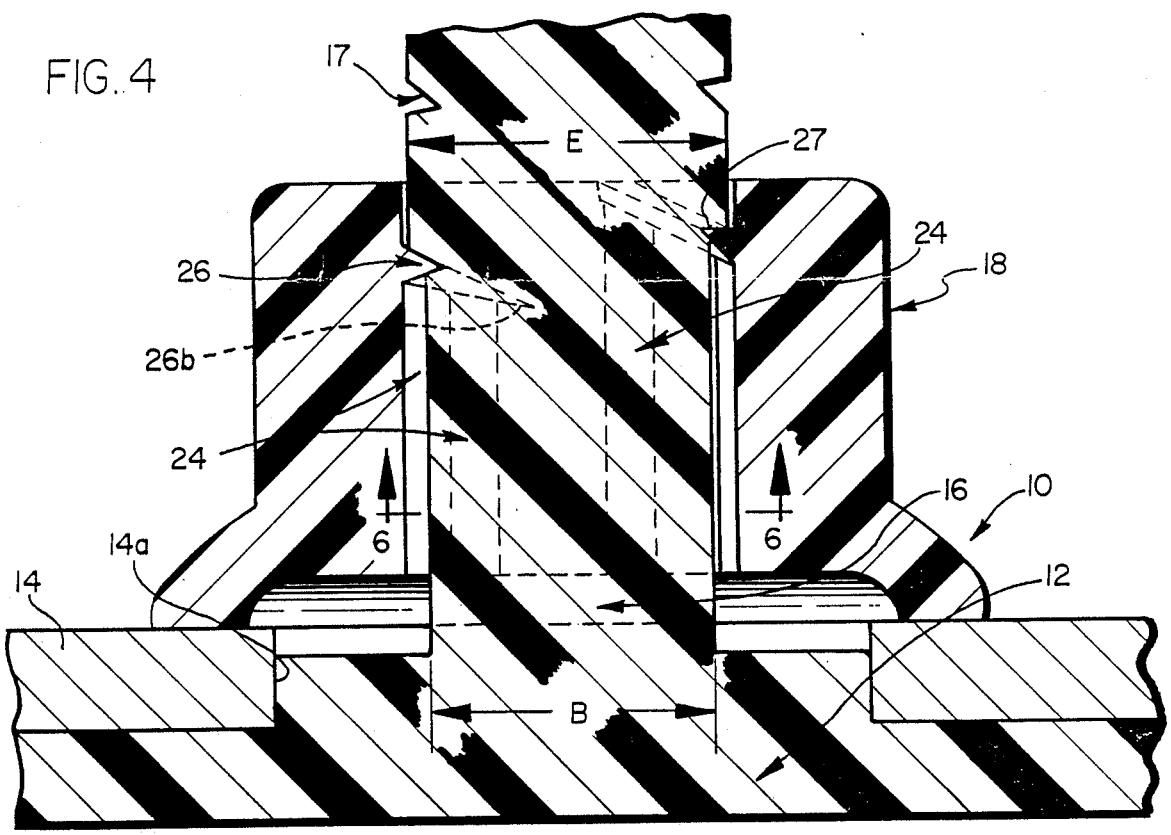
FIG. 4 is a sectional view taken along the line 4—4 in FIG. 2, viewed in the indicated direction and illustrating the nut fully assembled on the stack.

Referring to FIGS. 1-4, an embodiment of a joint according to the present invention is generally designated by referenced character 10. In the illustrated joint 10 a resilient, protective fascia strip 12 molded from engineering resin is mounted on a typical automotive bumper 14. A generally cylindrical unthreaded stud 16 integrally molded and projecting from the strip 12 is inserted through and projects from a mounting aperture 14a in the bumper 14 as best shown in FIG. 4. A locking nut 18 is then driven onto the stud 16 to secure the joint 10 and the assembly of the strip 12 on the bumper 14.

Figure 5:
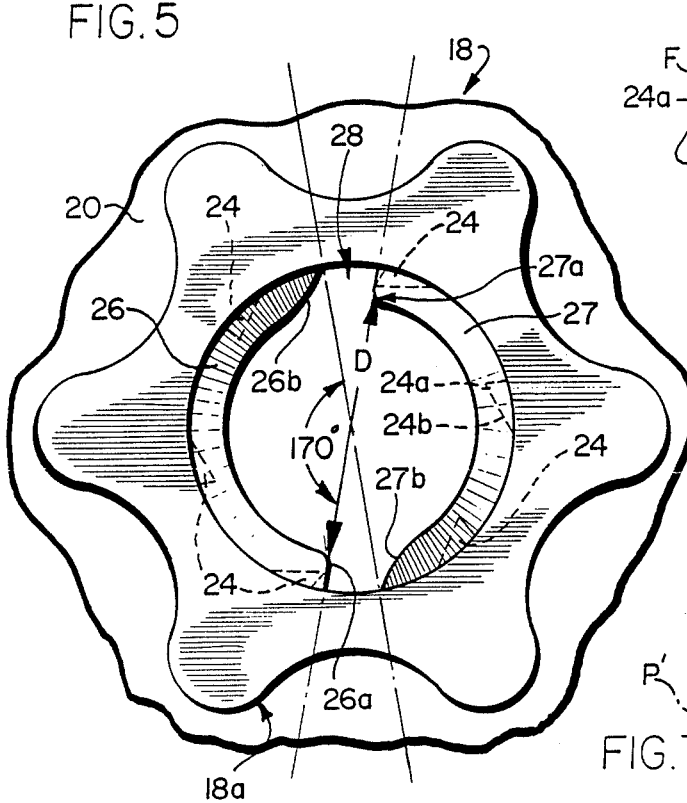
FIG. 5 is a top plan view of the nut shown in FIGS. 1-4.
Figure 6:
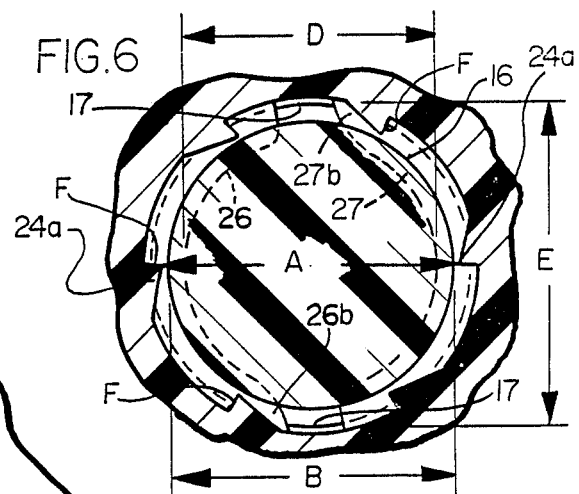
FIG. 6 is a sectional view taken along line 6—6 in FIG. 4, in the indicated direction.

Referring again to FIGS. 1 and 2, the nut 18 preferably has a peripheral profile 18a in a hexlobular pattern of the general type and kind known with respect to the TORX brand drive system for the advantages in driving the nut. Preferably, the nut 18 also includes a slightly concave flexible flange 20 forming the bearing surface at the pilot or entrance end of the nut 18. The nut 18 has a central, pilot bore 22 which opens at the pilot end adjacent the flange 20 and extends rearwardly through the nut 18, but terminates within the nut 18 at a medial point between the opposite ends of the nut. As best illustrated in FIGS. 5 and 6, the peripheral wall of the pilot bore 22 has an annularly spaced pattern of six ramped, axially elongate splines or teeth 24 whose apexes 24a are directed angularly inwardly from respective ramp surfaces 24b, as more fully described hereinafter. The annular pattern of teeth apexes 24a have an apex-to-apex, minor or inner diameter designated A which is at least equal to and preferably slightly greater than the diameter B of the stud 16 as shown in FIGS. 3 and 6. These relative dimensions of the diameters A and B enable the teeth 24 to provide alignment and guidance of the stud end 16a as it is inserted through the pilot end of the nut which is slipped over the stud in generally straight relation as shown in FIG. 3, with no significant frictional resistance in the initial operation to mount the nut.

Figure 7:
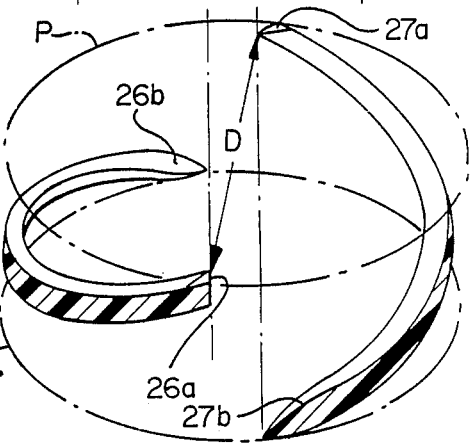
FIG. 7 is a diagrammatic view illustrating the relative configuration of the two partial helical nut thread turns shown in FIGS. 2-6.

Referring to FIGS. 3 and 4, the teeth 24 extend different lengths within the pilot bore 22 and terminate at respective medial depths within the nut at locations designated C which correspond to abutment of the respective teeth 24 against either of two helical thread turns or leads designated 26 and 27. As shown in FIGS. 5 and 7, the two helical thread turns 26 and 27 have equal pitch and also have helical configurations which are phased approximately, but slightly less than 180 degrees apart, so that the respective thread lead in portions 26a and 26b, as well as the terminal portion 27a and 27b are located in diametrical opposition across the bore aperture 28 at a distance designated D. The threads 26 and 27 preferably have the same pitch, respective points along threads 26 and 27 at any cross-sectional plane (two of which are shown as diagrammatic planes P and P¹ in FIG. 7) perpendicular to the axis of the nut lie at the same separation distance or crest diameter D, with the exception of the spacing of respective thread lead ends 26b and 27b which are preferably tapered and rounded as best shown in FIGS. 5 and 7 and further described hereinafter. As such, the thread turns 26 and 26 are axially spaced apart by a distance equal to one-half (½) the pitch. Each of the illustrated threads 26 and 27 extends less than one-half of a helical turn or approximately 170 degrees which is sufficient thread length for cold-forming a mating thread impression into the stud 16 described as follows.

The preferred form of the invention as illustrated, employs two partial thread turns 26 and 27 which are less than 180 degrees in circumferential length. It is contemplated, however, that the threads could extend for circumferential distances greater than 180 degrees, such that the terminal ends 26a and 27a of the threads would overlap the lead-in portion 26b and 27b. Also, while a pair of partial thread turns are employed, more could be used.

Referring particularly to FIGS. 3 and 6, the minor or crest diameter D of the threads 26 and 27 is smaller than the stud diameter B so that when the inserted stud end 16a reaches the thread lead ends 26b and 27b, the nut 18 is then rotatably driven. The threads 26 and 27 interfere with and outwardly displace the peripheral material of the stud to cold-form a mating, external thread impression generally designated 17 into the previously unthreaded stud 16 as shown in FIG. 4. In order to promote the cold-forming of the plastic stud with outward displacement of stud material to form the thread impression 17, in contrast to thread cutting and consequent removal of stud material, the thread lead ends 26b and 27b are preferably tapered or rounded and their symmetrical locations within the nut 18 promote mechanical balance of the applied torque in the cold-forming operation. In addition, the dual threads 26 and 27 beneficially increase the applied torque required to strip the nut 18 during the cold-forming operation by dividing the cold-forming stress on the stud 16 over larger surface area than would be engaged by a single cold-forming thread. The cold-forming is additionally promoted by the nut 18 being fabricated, preferably by molding a harder resin, for example, polyoxymethylene such as Delrin ® supplied by E. I. DuPont, relative to the plastic composition of the stud 16 which yields to the threads 26 and 27.

The configuration or placement of the thread turns 26 and 27 has been chosen to attain specific operational features. More specifically, as the thread turns 26 and 27 engage the stud 16, the forces created during cold-working of the stud are diametrically opposed, and thus, somewhat balanced. This balancing of the forces prevents the nut 18 from tipping or canting as it is driven onto the stud 16. Should canting of the nut occur, the driving operation is impaired and the desired final clamped engagement, as shown in FIG. 4, may not be attained.

The stud material which is displaced outwardly in cold-forming the thread impression 17 results in a major diameter E for the deformed stud portion which is not only larger than the original stud diameter B, but is also larger than the crest diameter of the threads 26 and 27, and the minor diameter A of the annular pattern of teeth or splines 24 on the nut 18. As a result, the outwardly displaced stud material of impression 17 obstructs the path of retraction of the six teeth 24 as best shown at F in FIG. 6. This obstruction promotes secured retention of the joint 10 by preventing withdrawal of the nut 18 by counter rotation until sufficient torque is deliberately applied to retract the teeth 24 through the obstructing stud impression 17 by a tooled operation to back off the nut. Preferably, the minor or thread crest diameter D should not be excessively smaller than the minor diameter A of the annular pattern of teeth 24 in order to prevent excessive resistance to retraction of the teeth 24 which could produce stripping or deforming the stud thread impression 17 when the nut 18 is deliberately backed off for removal of the nut from the stud 16.

The teeth or splines 24 serve multiple functions in providing alignment guidance in sliding the nut 18 onto the stud 16 and preventing the nut from becoming misaligned or cocked as the threads 26 and 27 are driven into the stud 16 to form the impression 17. In addition, the teeth or splines 24 also serve as a locking structure which is obstructed from withdrawal in the fully assembled joint 10. This locking feature allows the joint to be maintained without nut retraction, but with low clamping of the nut flange 20 against the bumper 14 to allow tolerance for differences in thermal expansion of the plastic fascia strip 12 (and stud 16) in relation to the typical metallic bumper 14, as well as the hard plastic nut 18. Furthermore, the inclination of the ramp surfaces 24b in generally projecting the apexes 24a slightly clockwise as viewed from the trailing end of the nut 18 in FIG. 5 provides that the stud surface 16 rides up ramp surfaces 24b in sliding engagement during the clockwise, driven rotation of the nut to cold-form the stud impression 17; in contrast, any initial counterclockwise rotation of the nut 18 will be resisted by the tendency of the inclined apexes 24a to dig into the periphery of the stud 16 and will thus prevent vibrational loosening of the nut 18.

While particular embodiments of the nut and joint of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A fastening nut for securement to an unthreaded stud, comprising: a nut body having a central through bore, said bore comprising guide means for providing alignment guidance during sliding insertion of said stud into said bore; and a plurality of separate helical threads disposed in said bore axially distinct from said guide means, and each said thread terminating within said bore adjacent said guide means, and each said helical thread projecting radially inwardly into said bore further than said guide means such that sequentially following the sliding insertion of said stud into said bore past said guide means, each said thread engages said stud periphery and cold-forms a respective mating thread therein, each said mating thread including radially outwardly displaced, cold-formed stud material which obstructs relative retraction of said guide means from said stud such that said guide means further defines locking structure interfering with motion relative to said mating thread and thereby promotes secured retention of said nut thereon.

2. A nut according to claim 1 wherein each of said helical threads has equal pitch, minor diameter, and major diameter thereof.

3. A nut according to claim 2 wherein said guide means comprises at least a partial annulus having an inner diameter larger than said minor thread diameter and said inner diameter being smaller than said major thread diameter.

4. A nut according to claim 1 wherein said guide means comprises an annular pattern of axially elongate teeth having apexes directed radially inwardly.

5. A nut according to claim 4 wherein each of said teeth includes a radially inwardly facing ramped surface terminating in said respective apex such that said respective ramp surfaces are inclined to allow sliding engagement against said stud in rotation of said nut during said formation of said mating thread in said stud and wherein said inclination of said respective ramp surfaces promotes biting interference of said respective apexes into said stud during reverse rotation of said nut in order to resist such reverse rotation and disassembly of said nut from said stud.

6. A nut according to claim 1 wherein said helical threads include a first and second threads having equal pitch and relatively configured such that respective terminal ends of said first and second threads are located in diametrical opposition across said bore whereby said first and second threads have respective helical configurations phased 180 degrees apart.

7. A nut according to claim 6 wherein each of said first and second threads extends a maximum of one half helical thread turn.

8. A nut according to claim 7 wherein said first and second threads respectively extend to an opening aperture at one end of said nut bore.

9. A nut according to claim 1 wherein the material from which said nut is formed is only slightly harder than that of the stud, such that said nut may be unthreaded from said stud, with said guide means deforming the external thread on said stud.

10. A nut according to claim 1 wherein said threads include at least two partial helical thread turns, said partial helical thread turn having their respective lead-in portions and terminal portions diametrically opposed with respect to the bore in said nut.

11. A nut according to claim 10 wherein said thread turns are on an equal helical pitches, with the thread turns being separated by a distance of one-half the pitch.

12. A nut according to claim 11 wherein said partial thread turns extends for less than 180 degrees.

13. A fastening nut for securing a molded component such as a bumper rub strip to a mounting surface, as for example, an automobile bumper, wherein said molded component includes an unthreaded stud, of a given diameter "B" and which will extend through an aperture in said mounting surface, said fastening nut comprising: A nut body having a central through bore, said bore comprising guide means for providing alignment guidance during insertion of said stud into said bore, said guide means defining an effective minor internal diameter "A"; and first and second internal helical threads disposed in said bore axially distinct from said guide means and terminating within said bore adjacent said guide means, said internal helical threads defining a minor thread diameter "D" which is less than the diameter of said stud and said guide means such that sequentially following the sliding insertion of said stud into said bore past said guide means, said internal helical threads engage said stud periphery and will cold-form mating external thread therein, said mating external thread being formed by radially outwardly displacing cold-formed stud material, such that said resulting external thread has a major diameter "E" which is greater than the effective internal diameter "A" of said guide means, such that upon retractive movement of the nut from the stud, said guide means will engage said external thread to obstruct and hinder relative retractive movement of the nut from said stud and thereby promotes secured retention of said nut thereon.

14. A nut according to claim 13 wherein said threads have equal pitch and are relatively configured such that respective terminal ends of said first and second threads are located in diametrical opposition across said bore whereby said first and second threads have respective helical configurations phased 180 degrees apart.

15. A nut according to claim 14 wherein each of said first and second threads extends a maximum of one half helical thread turn.

16. A nut according to claim 14 wherein said first and second threads respectively extend to an opening aperture at one end of said nut bore.

17. A joint structure for securing a studded work piece such as a bumper fascia strip to a support member, as for example, a bumper, comprising: a support member having a through passageway therein; a work piece having an elongate stud projecting through said passageway to expose a projecting end therefrom; a securing nut comprising: (a) a central through bore; (b) guide means partially defining said bore and located adjacent a leading aperture of the bore, said guide means defining an inner diameter equal to or slightly larger than the peripheral outer diameter of said stud enabling said guide means to provide aligning guidance in sliding said leading bore aperture onto said projecting end of said stud; and (c) first and second helical threads disposed in said bore adjacent a trailing aperture thereof, said threads having equal minor diameter smaller than said stud diameter and equal major diameter larger than said stud diameter and larger than said inner diameter of said guide means; and said stud and nut being fabricated from respective materials of relative hardness such that, after sliding said guide means onto and along said stud, said thread engages said stud periphery and cold-forms a mating thread therein having a major diameter of outwardly displaced stud material larger than said inner diameter of said nut guide means so that said mating thread obstructs retraction of said nut guide means from said stud and thereby promotes securement of said joint.

18. A joint structure according to claim 17 wherein said guide means comprises at least a partial annulus having an inner diameter larger than said minor thread diameter and said inner diameter being smaller than said major thread diameter.

19. A joint structure according to claim 17 wherein said guide means comprises an annular pattern of axially elongate teeth having apexes directed radially inwardly.

20. A joint structure according to claim 19 wherein each of said teeth includes a radially inwardly facing ramped surface terminating in said respective apex such that said respective ramp surfaces are inclined to allow sliding engagement against said stud in rotation of said nut during said formation of said mating thread in said stud and wherein said inclination of said respective ramp surfaces promotes biting interference of said respective apexes into said stud during reverse rotation of said nut in order to resist such reverse rotation and disassembly of said nut from said stud.

21. A joint structure according to claim 17 wherein said helical threads having equal pitch and are relatively configured such that respective terminal ends of said first and second threads are located in diametrical opposition across said bore whereby said first and second threads have respective helical configurations phased 180 degrees apart.

22. A joint structure according to claim 21 wherein each of said first and second threads extends a maximum of one half helical thread turn.

23. A joint structure according to claim 21 wherein said first and second threads respectively extend to an opening aperture at one end of said nut bore.

* * * * *